(12) United States Patent
Herrin

(10) Patent No.: US 6,837,231 B1
(45) Date of Patent: Jan. 4, 2005

(54) CYLINDER BANK WORK OUTPUT BALANCING BASED ON EXHAUST GAS A/F RATIO

(75) Inventor: Ronald J. Herrin, Troy, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/617,520

(22) Filed: Jul. 11, 2003

(51) Int. Cl.[7] .............................. F02D 41/14; F01L 1/34
(52) U.S. Cl. .................... 123/684; 123/90.17; 123/687; 123/692
(58) Field of Search ................. 123/90.11, 90.15–90.18, 123/436, 683, 684, 687, 691, 692

(56) References Cited

U.S. PATENT DOCUMENTS

| 5,140,955 A |   | 8/1992 | Sono et al. ............... 123/90.15 |
| 5,377,654 A | * | 1/1995 | LoRusso et al. ............ 123/692 |
| 5,469,818 A |   | 11/1995 | Yoshioka et al. ......... 123/90.15 |
| 6,397,813 B1 |   | 6/2002 | Han et al. .................... 123/308 |
| 6,408,806 B2 |   | 6/2002 | Sugiyama et al. ....... 123/90.15 |
| 2002/0189602 A1 | * | 12/2002 | Sugiyama et al. .......... 123/692 |

\* cited by examiner

*Primary Examiner*—Tony M. Argenbright
(74) *Attorney, Agent, or Firm*—Christopher DeVries

(57) ABSTRACT

A system for balancing first and second work outputs between first and second cylinder banks of an engine includes a first intake camshaft associated the first cylinder bank and a first fuel injector associated with the first cylinder bank. A controller trims a pulse-width of the first fuel injector until first and second A/F ratios of respective exhaust of the first and second cylinder banks are equivalent. The controller adjusts timing of the first intake camshaft to effect air flow into the first cylinder bank and trims the pulse-width to maintain equivalency of the first and second A/F ratios.

19 Claims, 3 Drawing Sheets

CYLINDER BANK WORK OUTPUT BALANCING BASED ON EXHAUST GAS A/F RATIO

FIELD OF THE INVENTION

The present invention relates to engine control, and more particularly to balancing work output of cylinder banks of the engine based on an exhaust gas air-to-fuel (A/F) ratio.

BACKGROUND OF THE INVENTION

Conventional internal combustion engines having a V-, W-or flat (i.e., horizontally opposed) shaped configurations include multiple cylinder banks. The cylinder banks include pistons that are reciprocally driven through cylinders by a combustion process to produce driving force. An air and fuel mixture is provided and is ignited within the cylinders during the combustion process. The air and fuel quantity within a cylinder defines the work output of the cylinder. The air rates of the cylinders are controlled by the phase angle or timing of a camshaft with respect to a driven crankshaft. The fuel rate is controlled by the pulse-width of a fuel injector.

The timing of intake valve closing with respect to piston position within the cylinder influences the volume of air that is drawn into the cylinder. When intake valve closing occurs near a bottom-dead-center (BDC) piston position, cylinder volume is changing slowly and variations in intake valve timing have only a minor effect. If an engine having variable cam timing implements an early or late intake valve closing strategy to improve engine efficiency, intake valve closing can occur when the piston velocity is higher and air volume into the cylinder is changing rapidly. Differences in the intake valve closing timing (i.e., cam position of the camshafts) can significantly influence the volume of air drawn into the cylinder.

Conventional control algorithms attempt to balance the bank-to-bank cam positions of the camshafts. This is achieved by measuring the radial position of mechanical targets installed on each camshaft or cam phasers associated with each camshaft. Balancing of the bank-to-bank cam positions, however, does not insure bank-to-bank balancing of intake air flow. This is a result of manufacturing and assembly variations that create ambiguity between sensed cam positions and actual timing of intake valves.

Imbalance of intake air flow results in an A/F ratio imbalance across the cylinder banks that effects engine smoothness and engine efficiency. Traditionally, the fuel rate is trimmed to compensate for air flow variation across the cylinder banks. However, this compensation strategy fails to correct the fundamental problem of air flow imbalance. Another method of alleviating this imbalance is to provide tighter manufacturing and assembly tolerances. This, however, results in increased manufacturing and assembly costs.

SUMMARY OF THE INVENTION

Accordingly, the present invention provides a system for balancing first and second work outputs between first and second cylinder banks of an engine. The system includes a first intake camshaft associated with the first cylinder bank and a first fuel injector associated with the first cylinder bank. A controller trims pulse-width of the first fuel injector until first and second A/F ratios of respective exhaust of the first and second cylinder banks are equivalent. The controller adjusts timing of the first intake camshaft to effect air flow into the first cylinder bank and trims the pulse-width to maintain equivalency of the first and second A/F ratios.

In one feature, the system further includes a first cam phaser that is interconnected with the first intake camshaft and that adjusts the timing of the first intake camshaft.

In another feature, the system further includes first and second exhaust oxygen sensors located in respective exhaust flow paths of the first and second cylinder banks. The controller determines the first and second A/F ratios of the first and second cylinder banks based on signals from the first and second oxygen sensors.

In another feature, the system further includes a second intake camshaft associated with the second cylinder bank and a second fuel injector associated with the second cylinder bank. The controller trims a pulse-width of the first and second fuel injectors until the fuel injectors achieve a target pulse-width. The controller adjusts timing of the first and second intake camshafts to effect respective air flows into the first and second cylinder banks and maintains equivalency of the first and second A/F ratios.

In still another feature, the controller determines the target pulse-width ratio based on engine speed and manifold absolute pressure.

In yet another feature, the system further includes a second cam phaser that is interconnected with the second intake camshaft and that adjusts the timing of the second intake camshaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
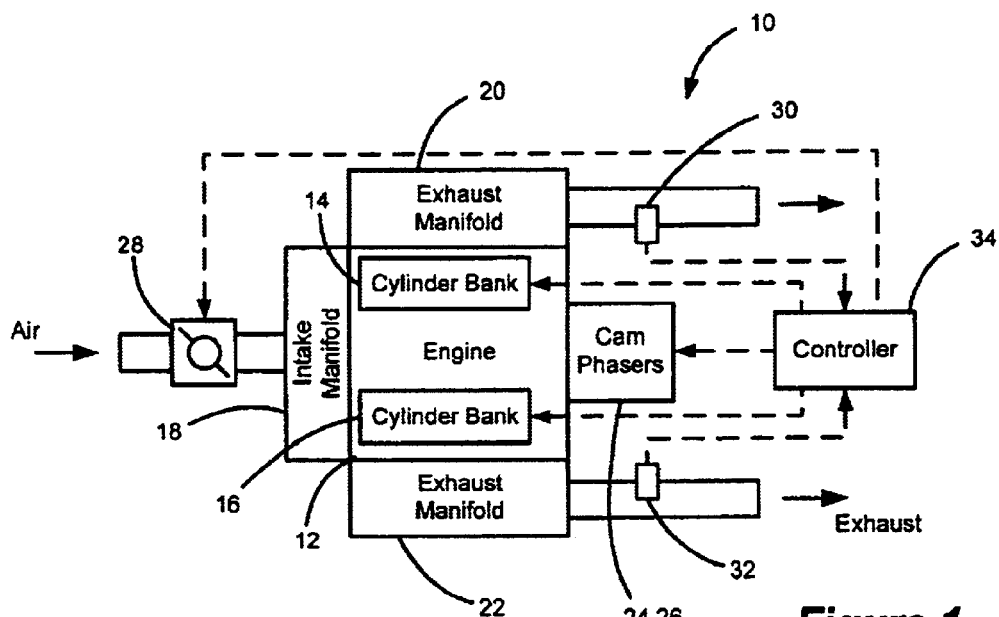
FIG. 1 is a functional block diagram of a vehicle including an engine.

Referring now to FIG. 1, a vehicle 10 is shown and includes an engine 12 having cylinder banks 14,16, an intake manifold 18, exhaust manifolds 20,22 and cam phasers 24,26. Air is drawn into the intake manifold 18 through a throttle 28 and is distributed to the cylinder banks 14,16. Exhaust gas from the cylinder banks 14,16 flows through the respective exhaust manifolds 20,22 to an exhaust system. Oxygen ($O_2$) sensors 30,32 are associated with each exhaust manifold 20,22. The $O_2$ sensors 30,32 measure the amount of $O_2$ in exhaust gas exiting the respective exhaust manifolds 20,22.

A controller 34 balances the cylinder banks 14,16 of the engine 12. The controller 34 communicates with the throttle 28, the cylinder banks 14,16, the cam phasers 24,26 and the $O_2$ sensors 30,32. As discussed in further detail below, the controller 34 receives signals from the $O_2$ sensors 30,32 to determine A/F ratios of the exhaust gas through the respective exhaust manifolds 20,22. The controller 34 controls operation of the cylinder banks 14,16 to adjust fuel injection and the cam phasers 24,26 to adjust fuel flow and air flow into cylinders of the cylinder banks 14,16, as will be described more fully below.

Figure 2:
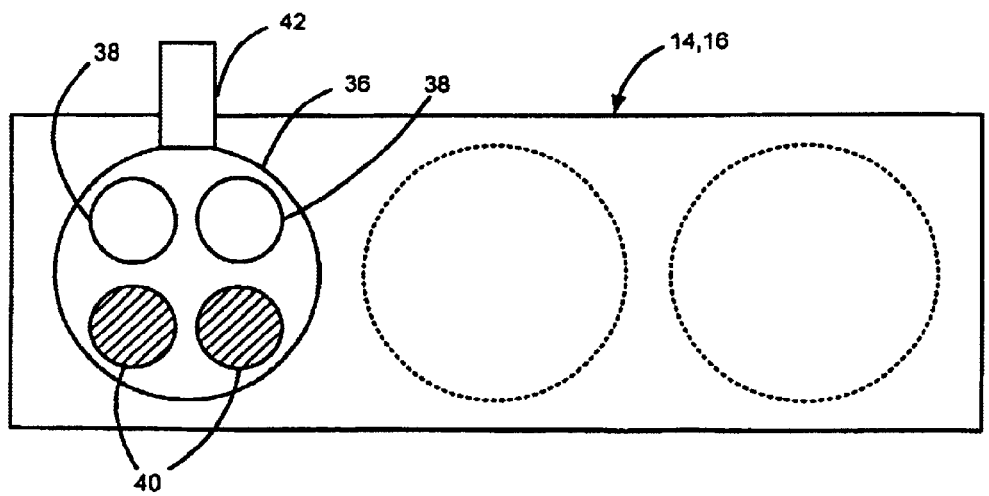
FIG. 2 illustrates a cylinder bank of the engine.

Referring now to FIG. 2, an exemplary cylinder bank 14,16 is shown. The cylinder bank 14,16 includes at least one cylinder 36. Additional cylinders are shown by dotted lines. Although the exemplary cylinder bank 14,16 illustrates three cylinders 36 (e.g., for a 6 cylinder V-type engine), the cylinder bank 14,16 can include any number of cylinders 36 based upon the particular design of the engine 12. Each cylinder 36 includes one or more inlet valves 38, one or more exhaust valves 40 and one or more fuel injectors 42 associated therewith.

The inlet valves 38 regulate opening and closing of inlet ports (not shown) to control air intake into the cylinder 36. The exhaust valves 40 regulate opening and closing of exhaust ports (not shown) to control exhaust of combustion gas from the cylinder 36. The fuel injector 42 can be configured in two manners. The fuel injector 42 can inject fuel directly into the cylinder 36 to mix with the air therein for combustion. Alternatively, the fuel injector 42 can be disposed upstream of the inlet valves 38 to inject fuel into the intake air prior to the intake air passing by the open inlet ports into the cylinder 36. The fuel injector 42 is pulse-width modulated to control the fuel rate into the cylinder 36.

The controller 34 adjusts the pulse-widths of the fuel injectors 42 to regulate the A/F ratios of the cylinder banks 14,16. The fuel injector pulse-widths are individually and independently trimmed as between the cylinder banks 14,16. More particularly, the controller 34 determines a nominal pulse-width for the cylinder banks 14,16 based on the current operating condition (i.e., engine speed and load). If the nominal pulse-width is commanded by the controller 34 and the cylinder banks 14,16 are not at the desired A/F ratio, then the pulse-widths are trimmed by the controller 34 to bring the cylinder banks 14,16 to the desired A/F ratio. The trim values are learned for each cylinder bank 14,16. As described in further detail below, the controller 34 compares the learned trim values of the fuel injector pulse-widths to determine air intake imbalance across the cylinder banks 14,16.

Figure 3:
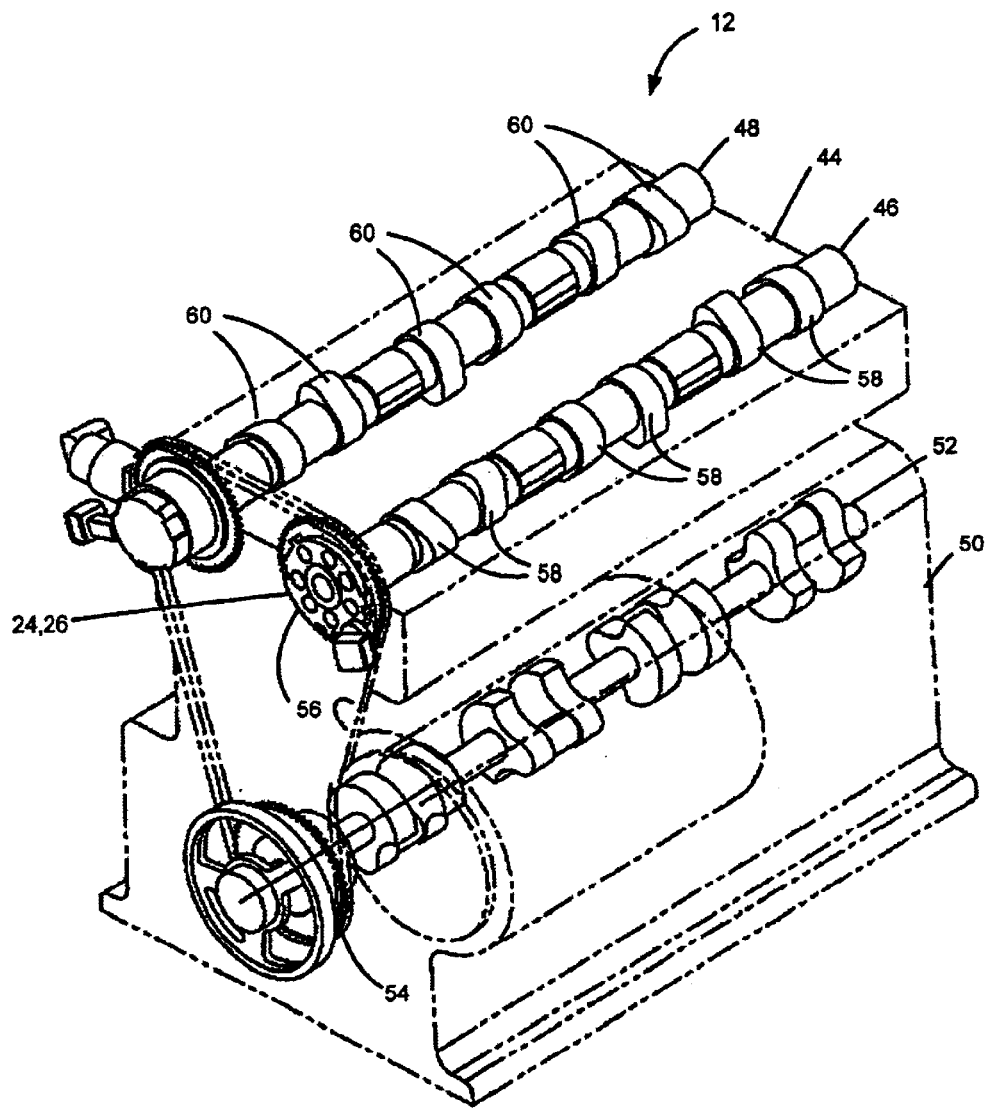
FIG. 3 is a perspective view of a portion of the engine, illustrating an intake camshaft and an exhaust camshaft associated with a cylinder bank, a crankshaft and cam phasers.

Referring now to FIG. 3, a perspective view of a portion of the engine 12 is shown. The engine 12 includes a cylinder head 44 that supports an intake camshaft 46 and an exhaust camshaft 48 and a cylinder block 50 that supports a crankshaft 52. Each cylinder bank 14,16 includes an intake camshaft 46 and an exhaust camshaft 48. Accordingly, the illustration of FIG. 3 represents the camshafts 46,48 associated with one cylinder bank 14,16. The camshaft phasers 24,26 are interconnected with the intake camshafts 46 to adjust the phase angle or timing of the intake camshaft 46. The crankshaft 52 is interconnected to pistons (not shown) by connecting rods (not shown). The pistons are driven by the combustion process to provide the driving force that rotates the crankshaft 52. A sprocket 54 is fixed for rotation with the crankshaft 52 and is interconnected to a sprocket 56 by a belt or chain. The sprocket 56 drives the intake camshaft 46.

The intake camshaft 46 includes intake cam pairs 58 associated with each cylinder 36. Each intake cam 58 interfaces with a respective rocker arm (not shown) to control movement of the intake valves 38 for regulating opening and closing of the intake ports. Similarly, the exhaust camshaft includes exhaust cam pairs 60 associated with each cylinder 36. Each exhaust cam 60 interfaces with a respective rocker arm (not shown) to control movement of the exhaust valves 40 for regulating opening and closing of the exhaust ports.

The camshaft phasers 24,26 either advance or retard the intake valve timing. The ability of the camshaft phasers 24,26 to adjust the timing is limited in either direction. That is to say, the camshaft timing can only be adjusted so far until a home or parked position is achieved. Once the camshaft phaser 24,26 has sufficiently adjusted the camshaft timing in one direction to achieve the parked position, the camshaft phasers 24,26 can no longer adjust the camshaft timing in that direction. In other words, in the parked position the camshaft timing adjustment has reached its maximum.

The cylinder bank balancing control of the present invention enables balancing of air rates, A/F ratios, fuel rates and work output across the cylinder banks 14,16. As explained in further detail below, the cylinder bank balancing control uses differences in the fueling rate across the cylinder banks 14,16 as an indicator of bank-to-bank variation in intake cam timing. Exhaust gas A/F ratios are determined for each cylinder bank 14,16 using the $O_2$ sensors 30,32. The fuel rate is adjusted by trimming the injector pulse-width to balance the A/F ratios across the cylinder banks 14,16. As a result, the bank-to-bank pulse-widths trim values vary. The difference between the injector pulse-width trim values across the cylinder banks 14,16 is used to adjust the intake cam timing using the cam phasers 24,26 until the fuel rates are balanced.

Figure 4:
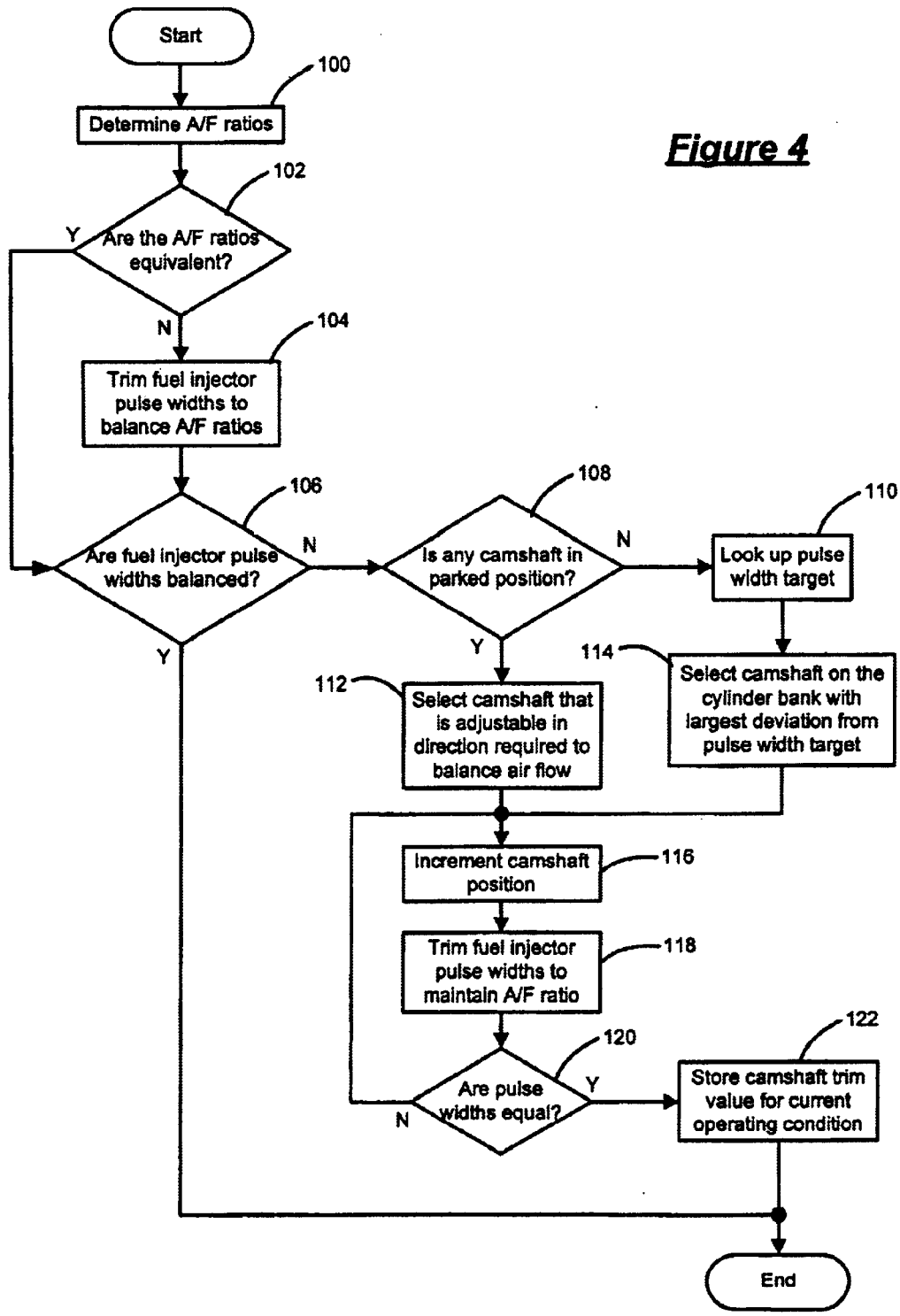
FIG. 4 is a flowchart illustrating steps for balancing a cylinder bank according to the principles of the present invention.

Referring now to FIG. 4, the cylinder bank balancing control will be described in detail. In step 100, control determines the A/F ratios of the cylinders banks 14,16 based on signals from the $O_2$ sensors 30,32. In step 102, control determines whether the A/F ratios are equivalent. If not, control continues in step 104. If so, the A/F ratios across the cylinder banks 14,16 are balanced and control continues in step 106.

In step 104, control trims the fuel injector pulse-widths of the cylinder banks 14,16 until the A/F ratios balance. Once the A/F ratios are balanced, control determines whether the fuel injector pulse-widths across the cylinder banks 14,16 are balanced in step 106. If the pulse-widths are balanced, control ends. Otherwise, control continues in step 108 to determine whether any intake camshaft 46 is in the parked position. If not control continues in step 110. If so, control continues in step 112.

In step 110, control determines the nominal pulse-width or pulse-width target of the fuel injectors 42 from a look-up table. The pulse-width target is based on the current vehicle operating conditions such as throttle position, engine speed (RPM), manifold absolute pressure (MAP) and the like. In step 114, control selects the intake camshaft 46 on the cylinder bank 14,16 that has the largest pulse-width deviation from the pulse-width target. Control increments the intake camshaft position in step 116 in the direction needed to converge the pulse-widths of the cylinder banks 14,16.

In step 112, control selects the intake camshaft 46 that is adjustable in the direction required to balance the air flow. More specifically, if, in step 108, it is determined that one of the intake camshafts 46 is in the parked position adjustment of the particular intake camshaft 46 is limited to a single direction (i.e., advance or retard). Therefore, the intake camshaft 46 that is able to be adjusted in the desired direction is selected. In step 116, control increments the intake camshaft position in the direction needed to converge the pulse-widths of the cylinder banks 14,16.

As the intake camshaft timing is incremented, control trims the fuel injector pulse-width of the corresponding cylinder bank 14,16 in step 118. In this manner, the A/F ratio of the cylinder bank 14,16 is maintained and the pulse-width converges with the pulse-width of the other cylinder bank 14,16. In step 120, control determines whether the fuel injector pulse-widths across the cylinder banks 14,16 are balanced. If not, control loops back to step 116 to increment the intake camshaft position. If so, control stores the intake camshaft trim value for the current operating conditions in step 122 and control ends.

Alternatively, it is anticipated that the cylinder bank balancing control can trim the intake camshaft positions until both cylinder bank pulse widths achieve the pulse-width target. To achieve this, control increments the camshaft positions of both intake camshafts 46 of the cylinder banks 14,16. Concurrently, control trims the fuel injector pulse-widths until they converge on the pulse-width target. In this manner, the cylinder bank balancing control can maintain the desired A/F ratio balance across the cylinder banks 14,16 and achieve the pulse-width target for both cylinder banks 14,16.

Although the ASF ratio sensing described above is for the cylinder bank 14,16, it is anticipated that the A/F ratio for individual cylinders within each cylinder bank can be determined. Further, it is anticipated that pulse-width control of individual fuel injectors 42 in each cylinder bank 14,16 is achievable. In such a case, the cylinder bank balancing control of the present invention determines an average pulse-width value for the fuel injectors 42 of each cylinder bank 14,16. The average pulse-width values of the cylinder banks 14,16 are compared to determine imbalance across the cylinder banks 14,16 or achievement of the pulse-width target, Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following

What is claimed is:

1. A system for balancing first and second work outputs between first and second cylinder banks of an engine, comprising:
   a first intake camshaft associated with said first cylinder bank;
   a first fuel injector associated with said first cylinder bank; and
   a controller that trims a pulse-width of said first fuel injector until first and second A/F ratios of respective exhaust of said first and second cylinder banks are equivalent, adjusts timing of said first intake camshaft to effect air flow into said first cylinder bank and trims said pulse-width to maintain equivalency of said first and second A/F ratios.

2. The system of claim 1, further comprising a first cam phaser that is interconnected with said first intake camshaft and that adjusts said timing of said first intake camshaft.

3. The system of claim 1, further comprising first and second exhaust oxygen sensors located in respective exhaust flow paths of said first and second cylinder banks, wherein said controller determines said first and second A/F ratios of said first and second cylinder banks based on signals from said first and second oxygen sensors.

4. The system of claim 1, further comprising:
   a second intake camshaft associated with said second cylinder bank; and
   a second fuel injector associated with said second cylinder bank, wherein said controller trims a pulse-width of said first and second fuel injectors until said fuel injectors achieve a target pulse-width, adjusts timing of said first and second intake camshafts to effect respective air flows into said first and second cylinder banks and maintains equivalency of said first and second A/F ratios.

5. The system of claim 4, wherein said controller determines said target pulse-width based on engine speed and manifold absolute pressure.

6. The system of claim 4, further comprising a second cam phaser that is interconnected with said second intake camshaft and that adjusts said timing of said second intake camshaft.

7. A method of balancing first and second work outputs between first and second cylinder banks of an engine, comprising:
   trimming a fuel injector pulse-width of one of said first and second cylinder banks until first and second A/F ratios of said first and second cylinder banks am equivalent;
   adjusting timing of a camshaft of one of said first and second cylinder banks to effect air flow into one of said first and second cylinder banks; and
   trimming said fuel injector pulse-width to maintain equivalency of said first and second A/F ratios.

8. The method of claim 7, further comprising:
   determining said first and second A/F ratios of said first and second cylinder banks; and
   comparing said first and second A/F ratios, wherein said step of trimming said fuel injector pulse-width occurs if said first and second A/F ratios are not equal.

9. The method of claim 8, wherein said first and second A/F ratios are determined as an average A/F ratio of respective cylinders of said first and second cylinder banks.

10. The method of claim 7, further comprising comparing said fuel injector pulse-widths of said first and second cylinder banks, wherein said step of adjusting timing of said camshaft occurs if said first and second fuel injector pulse-widths are not equal.

11. The method of claim 7, further comprising determining a particular camshaft to adjust based on a current position of said camshafts.

12. The method of claim 7, further comprising:
   determining a pulse-width target; and
   trimming said fuel injector pulse-widths until said fuel injector pulse-widths are equal to said pulse-width target.

13. The method of claim 12, wherein said pulse-width target is based on engine speed and manifold absolute pressure.

14. A method of balancing first and second work outputs between first and second cylinder banks of an engine, comprising:
   determining whether first and second A/F ratios of said first and second cylinder banks are unequal;

trimming a fuel injector pulse-width of one of said first and second cylinder banks until said first and second A/F ratios ate equivalent;

comparing respective pule-widths of said first and second cylinder banks;

adjusting timing of a camshaft of one of said first and second cylinder banks to effect air flow into one of said first and second cylinder banks if said respective fuel injector pulse-widths are unequal; and trimming said fuel injector pulse-width to maintain equivalency of said first and second A/F ratios.

15. The method of claim 14, further comprising measuring an oxygen content of respective exhaust streams from said first and second cylinder banks to determine said first and second A/F ratios.

16. The method of claim 14, wherein said first and second A/F ratios are determined as an average A/F ratio of respective cylinders of said first and second cylinder banks.

17. The method of claim 14, further comprising determining a particular camshaft to adjust based on a current position of said camshafts.

18. The method of claim 14, further comprising:
determining a pulse-width target; and
trimming said fuel injector pulse-widths until said fuel injector pulse-widths are equal to said pule-width target.

19. The method of claim 18, wherein said pulse-width target is based on engine speed and manifold absolute pressure.

* * * * *